Nov. 26, 1940.　　　J. S. DONALDSON　　　2,222,654
DEVICE FOR PREVENTING THE ESCAPE OF FLUID UNDER PRESSURE
Filed Oct. 20, 1937
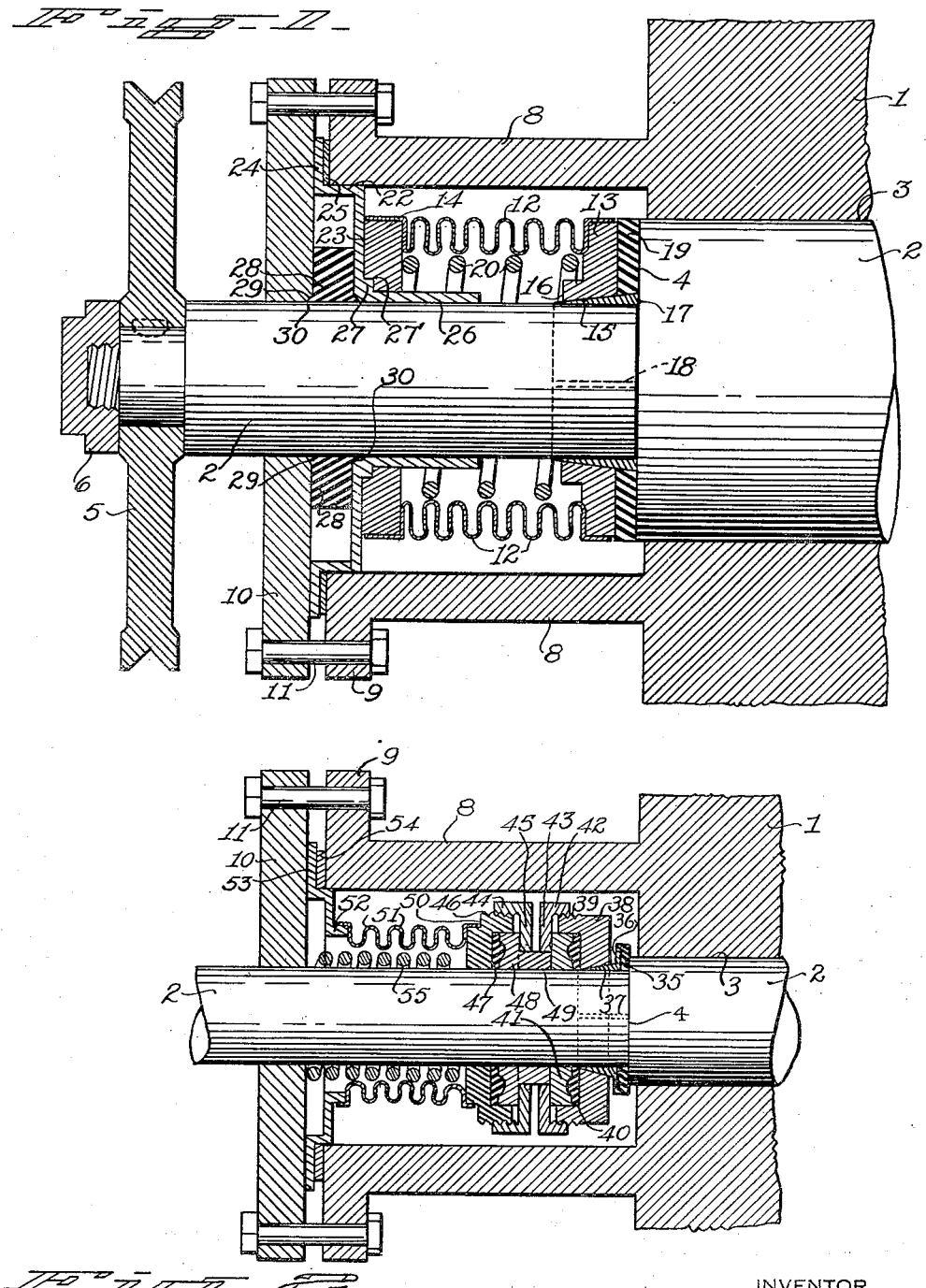
INVENTOR
John Shearman Donaldson
BY
Arthur L. Kent
his ATTORNEY Patented Nov. 26, 1940

2,222,654

UNITED STATES PATENT OFFICE 2,222,654

DEVICE FOR PREVENTING THE ESCAPE OF FLUID UNDER PRESSURE

John Shearman Donaldson, St. Albans, N. Y.

Application October 20, 1937, Serial No. 169,943

3 Claims. (Cl. 286—11)

This invention relates to a device for preventing fluid under pressure from escaping along surfaces, one of which moves or revolves against the other. The invention is particularly useful for preventing the escape of refrigerants along a rotating shaft from the refrigerating space of a refrigerator, but it is not restricted to this particular use. Heretofore, difficulties have been encountered because so much of the refrigerant escapes in the course of time around the rotating shaft that enters the refrigerating space that the refrigerant becomes ineffective or cannot be compressed to the desired point.

In carrying out this invention, a gasket or seal is provided around a rotating shaft that extends through an opening in a wall of a container, that is kept under pressure, in such manner that fluid is prevented from escaping around the shaft even after the bearings of the shaft have worn sufficiently to cause the shaft to be out of alignment and even after the surfaces have become worn due to the fact that stationary and rotating surfaces are pressed together in the device. The parts can be readily removed and replaced for renewal or repair.

It is well known that a ground rotating surface of metal can be pressed against a corresponding stationary metal surface in such a way as to prevent leakage along the surfaces provided the area is large enough and sufficient pressure is applied to keep the surfaces in firm contact.

By the present invention, sufficient pressure is provided to keep fluid under pressure from escaping between the surfaces, sufficient area is provided at the contacting surface to give long life, and provision is made for taking up the wear and provision is also made to prevent one of the sealing surfaces from shifting relative to the drive shaft.

The invention will be understood from the description in connection with the accompanying drawing, in which:

Fig. 1 is a longitudinal section through an illustrative embodiment of the invention; and Fig. 2 is a similar view of a modification thereof.

In the drawing, reference character 1 indicates a section of a wall of a container or the like which is filled with a fluid under pressure. For example, this may be a wall of the space for the refrigerant of a refrigerator. A shaft 2 passes through a hole or bearing 3 in the wall 1 and into the refrigerant space where it drives the pump (not shown) for compressing and circulating the refrigerant.

A shoulder 4 is provided on the shaft 2 leaving a reduced portion thereof outside of the wall 1, to which reduced portion a pulley 5 for driving the shaft may be attached by means of the nut 6.

A cylindrical housing 8 is provided around the extending portion of the shaft 2 and is integral with or securely and hermetically attached to the wall 1. A flange 9 is provided on the housing 8, and a pressure plate 10 is attached thereto by means of the bolts 11.

A bellows 12 of spring metal is provided around the reduced portion of the shaft 2 and is kept under compression. Metal rings or thick washers 13 and 14 with holes at their centers are provided, and the cylindrical ends of the bellows 12 are attached to the peripheries of these rings 13 and 14 by being soldered thereto or otherwise so attached that hermetically sealed joints are provided. The hole through the ring 13 is beveled as indicated at 15 to make a conically shaped hole, and a flange 16 is provided along its inner edge. A ring 17 that is split longitudinally, as indicated at 18, has its inside of cylindrical shape to slide along the reduced portion of the shaft 2 and its outside is beveled to correspond to the beveled surface 15 of the ring 13. A washer 19 of resilient material, such as rubber or the like, is provided between the ring 13 and shoulder 4. This washer is normally slightly thicker than the space in which it is located so that it will be constantly under compression. A compression spring 20 is provided between the rings 13 and 14 to aid the bellows 12 in pressing these rings away from each other.

A bearing plate 22 has a large flat bearing surface 23 against which the corresponding large bearing surface of the ring 14 bears. The bearing plate 22 is provided with a flange 24 against which the pressure plate 10 presses when the bolts 11 are tightened. An annular lead gasket 25 is provided between the flange 24 of the pressure plate 22 and the end of the housing 8. A cylindrical extension 26 is provided on the plate 22 and extends along the reduced portion of the shaft 2. A square cornered outer annular rib 27 is provided on the plate 22 where the extension 26 joins it, and a correspondingly shaped recess 27' is provided at the edge of the ring 14 to receive this rib.

A ring 28 of resilient material, such as rubber or the like, is provided between the plates 10 and 22 and is thick enough to be held under compression when the bolts 11 are tightened. This ring 28 may be provided with circular ribs 29 that are somewhat triangularly shaped in cross-section and fit into correspondingly shaped chamfered recesses 30 in the plates 10 and 22 around the holes in these plates, thus providing an elongated resilient cylindrical surface of the ring 28 bearing against the shaft 2.

With this structure, the relatively moving surfaces between the ring 14 and plate 22 along which fluid tends to escape from the housing 8 after it enters this housing through the hole 3 are not only made relatively large but provision is made to keep one of these surfaces moving with respect to the other with certainty while the shaft 2 revolves. This is accomplished by providing the split ring 17 which becomes wedged in place when the bolts 11 are tightened because the right hand end of this ring 17 bears against the shoulder 4 and prevents it from moving longitudinally on the shaft, while the bellows 12 and compression spring 20 move the ring 13 to the right, thus wedging this ring 13 to the ring 17 and clamping the ring 13 on the shaft 2. At the same time the resilient washer 19 is put under pressure to keep the space between the ring 13 and shoulder 4 hermetically sealed so that the fluid which passes through the hole 3 into the housing 8 can not reach the reduced part of the shaft 2 near the shoulder 4. The gasket 25 prevents such material from escaping at the end of the housing 8. Also, the large area at 23 where the rotating ring 14 is pressed against the bearing surface of the plate 22 prevents the fluid from escaping at that place. However, if because of some irregularity fluid should enter this space, resistance to its reaching the shaft 2 would be interposed by the elongated path along the outer edge and one side of the rib 27 and thence along both surfaces of the cylindrical extension 26 before it could even reach the washer or gasket 28 which is under compression and is pressed by the chamfered surfaces 30 against the shaft 2, thus further preventing escape of fluid even if it should reach that far.

By removing the nut 6 and bolts 11, the pulley 5 and plate 10 can be taken off so that the device can be readily taken out and a new one substituted when desired.

In the modification shown in Fig. 2, like parts are designated by the same reference characters as in Fig. 1 and parts are omitted. In this modification the seal or portions which wear can be readily replaced without the necessity of renewing other parts.

Reference character 35 indicates a packing seal washer of resilient material such as rubber, for example, bearing against the shoulder 4 on the shaft 2. The integral flange 36 on the outer or enlarged end of the conically shaped split ring wedge 37 on the reduced part of the shaft 4 compresses into the packing seal 35.

A retaining member or housing 38 on the shaft 2 has a beveled inner surface for the split ring 37 and its outer surface may be threaded as indicated at 39. It houses a packing seal washer 40 of resilient material and a hardened ground steel washer 41. A ring 42 which may be threaded internally so as to screw onto the housing 38 has a clamping flange 43 to press the washer 41 against the packing 40.

A ring 44 similar to ring 42 has a clamping flange 45 on its edge towards the flange 43. It may be screwed upon the retaining member or housing 46 which houses the packing ring 47 and hardened ground steel washer 48 which may have a cylindrical extension 49 with a ground end bearing against the ground surface of the washer 41. This extension 49 may be an integral part of the washer 48 or it may be a separate friction ring on the reduced portion of the shaft 2. In the latter case both of its faces would be ground.

The housing 46 is provided with an annular recess 50 to which one end of a metal bellows 51 is soldered or otherwise hermetically sealed. The other end of the bellows 51 is hermetically sealed to the flange 52 of a stepped circular plate 53 which is held against the end of the housing 8 by the pressure plate 10 with a gasket 54 of lead of other leak-proof material between it and the housing 8. A compression spring 55 between the pressure plate 10 and housing 46 may be used to aid the bellows 51 in keeping a seal at the relatively moving surfaces.

When there are threads on the housings 38 and 46 and the rings 42 and 44, they are so cut that the rotation of the shaft 2 tends to tighten these rings upon their respective housings, thus keeping the seals 40 and 47 tight so that the fluid does not reach the shaft 2 by passing along the places where they are located. The ground hardened steel surfaces at the end or ends of the extension 49 and at the side of the washer 41, or of the washers 41 and 48, which are pressed together by the bellows 51 and spring 55, keep the fluid from reaching the shaft 2 through the space between the rings 42 and 44. If the extension 49 is made an integral part of the washer 48 it remains stationary while the washer 41 turns with the shaft 2, but if made a separate friction ring it may turn relative to washer 41 or washer 48 or relative to both.

When any of the parts 41, 48 and 49 need renewing because of wear, this may be readily done by loosening the bolts 11, taking out the bellows 51 and housings 46 and 38, and removing the retaining rings 44 and 42, whereupon the washers 48 and 41 as well as the extension or friction ring 49 can be taken out, new ones put in their places, and the parts quickly replaced.

What is claimed is:

1. An anti-leak device for a rotating shaft, comprising a stationary member having a bearing surface, a rotatable member having a bearing surface pressed against said first named surface, means comprising a shoulder on said shaft and a beveled ring split axially from edge to edge thereof on said shaft to keep said rotatable member rotating with said shaft, and a seal surrounding said split ring between said rotatable member and said shoulder.

2. An anti-leak device for a rotating shaft, comprising a rigidly held stationary member having a smooth metal bearing surface, a rotatable member having a bearing surface pressed against said first named surface, means comprising a shoulder on said shaft and a beveled ring split axially from edge to edge thereof on said shaft to keep said rotatable member rotating with said shaft, and a seal surrounding said split ring between said rotatable member and said shoulder.

3. An anti-leak device for a rotating shaft, comprising a resiliently held non-rotatable member having a smooth metal bearing surface, a rotatable member having a bearing surface pressed against said first named surface, means comprising a shoulder on said shaft and a beveled ring split axially from edge to edge thereof on said shaft to keep said rotatable member rotating with said shaft, and a seal surrounding said split ring between said rotatable member and said shoulder.

JOHN SHEARMAN DONALDSON.